J. L. CREVELING.
ELECTRIC SYSTEM.
APPLICATION FILED APR. 4, 1916.
1,328,321.
Patented Jan. 20, 1920.
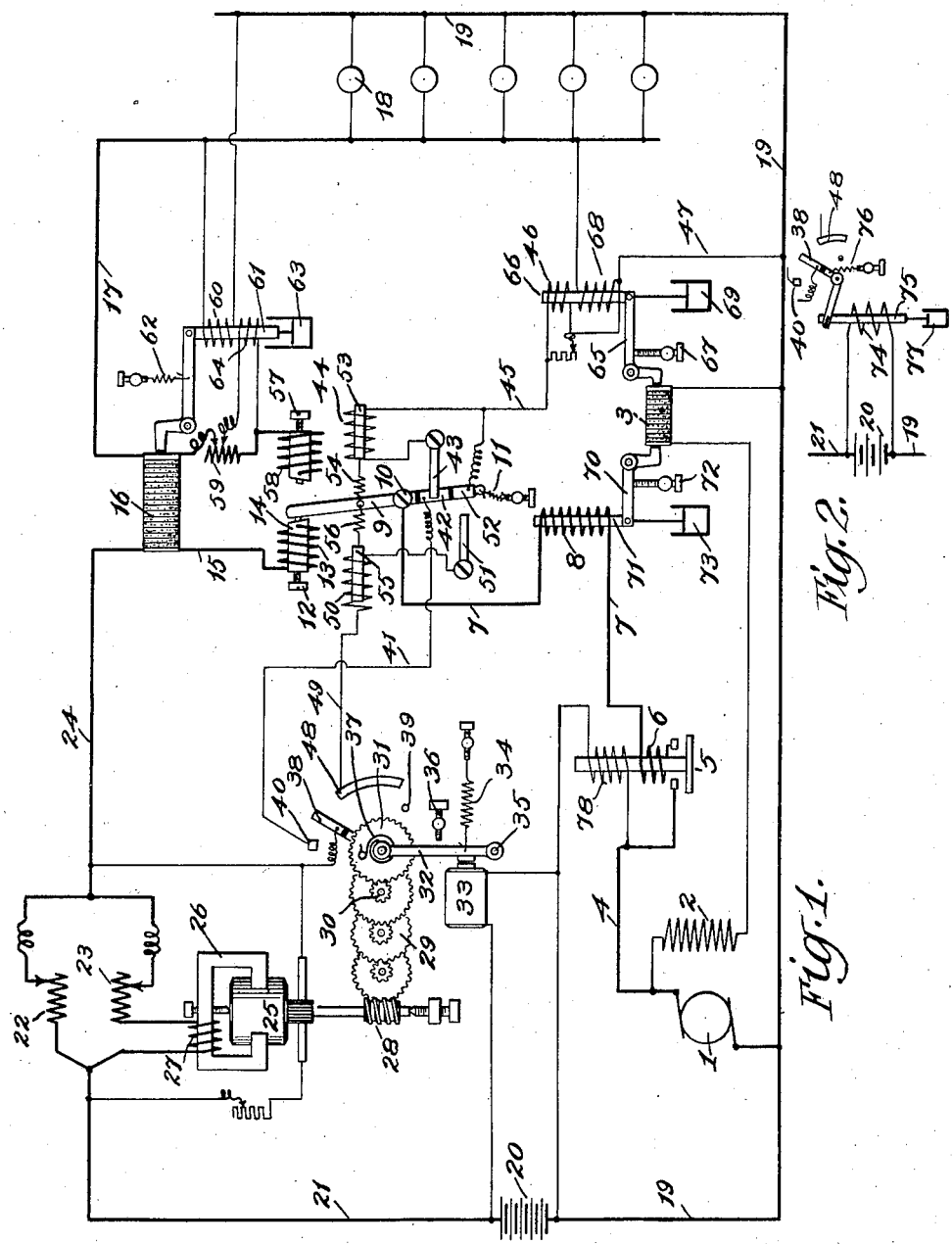
INVENTOR
John L. Creveling

UNITED STATES PATENT OFFICE.

JOHN L. CREVELING, OF WHITE PLAINS, NEW YORK, ASSIGNOR TO GOULD COUPLER COMPANY, A CORPORATION OF NEW YORK.

ELECTRIC SYSTEM.

1,328,321.  Specification of Letters Patent.  Patented Jan. 20, 1920.

Application filed April 4, 1916. Serial No. 88,801.

*To all whom it may concern:*

Be it known that I, JOHN L. CREVELING, a citizen of the United States, residing at White Plains, in the county of Westchester and State of New York, have invented certain new and useful Improvements in Electric Systems, of which the following is a specification.

My invention is particularly applicable to that class of electric systems wherein it is desired to maintain translating devices by means of a storage battery and a coöperating source of electrical potential difference wherein the source at times supplies current to the battery, and at times to the translating devices, which devices are maintained by the battery when the said source is ineffective.

My invention has for a particular object to provide means whereby a system of the character above mentioned may be automatically operated.

In the drawing, Figure 1 is a diagrammatic representation of an electric system which is shown for the purpose of explaining one type of system falling within the scope of my invention; and Fig. 2 is a diagrammatic representation of a portion of a modified system which will be explained with reference to Fig. 1, for the purpose of illustrating another concrete case falling within the scope of my invention.

In Fig. 1, 1 represents a controllable source of electrical potential difference indicated as a generator, provided with a field coil 2, having in series therewith a regulating resistance 3, which in this instance is indicated, for example, as of the carbon pile variety. The positive terminal of the generator is connected by wire 4 with one terminal of the automatic switch indicated at 5, the other terminal of which is connected through a series coil 6, forming a part of the said switch with the wire 7, and through a series coil 8 with the movable conducting lever 9 of magnetic material, pivoted as at 10 and normally swung in one or the other of two definite positions, as will hereinafter be described, as by the adjustable " snap motion " compression spring 11, tending to revolve the lever further in one direction or the other after a predetermined movement has been given to the lever in one direction or the other. When in the position shown in the drawing, the lever 9 electrically connects the wire 7 with the adjustable screw 12 in electrical communication with one end of the winding 13 about the magnetic core 14, the opposite end of the winding 13 being connected as by wire 15 with one terminal of any suitable translation circuit regulator, in this instance indicated as a carbon pile 16, the opposite terminal of which is connected as by wire 17 with the positive terminals of the translating devices 18, the negative terminals of which are connected as by wire 19 with the negative terminal of the source 1 and with the negative terminal of the storage battery 20. The positive of the storage battery is connected as by wire 21 through the adjustable shunts 22 and 23 and wire 24 to the wire 15. Around the shunts 22 and 23 there is connected the armature 25, operating within the field of the magnet 26, so as to form the driving element of a current metering mechanism, the relative operation of which may be varied when current is passing through it in one direction or the other, as by means of the coil 27, indicated upon the permanent field magnet 26, and in series with the adjustable shunt 23, as will hereinafter more plainly appear. The armature 25 carries the worm or other suitable equivalent 28, engaging a train of gears indicated at 29. Either a friction or tooth pinion, as indicated at 30, may be employed to engage the friction or tooth disk 31, so as to revolve the same when the lever 32, carrying the disk 31, is held in the position shown in the drawing, in which position the magnet 33 tends to hold the same when energized by current, indicated in this example as taken from across the battery connections. The adjustable spring 34 tends to move the lever 32 about its pivot 35 and bring the same into contact with the adjustable stop 36, which is so adjusted that when the lever 32 is brought against the same, the disk 31 will have its operative contact with 30 broken, whereupon the spring 37 will swing the disk in a right-handed direction until the insulated lever 38, carried thereby, comes into contact with a suitable stop 39. The arrangement of the metering mechanism is such that when current is being delivered from the generator to the storage battery 20, the revolution of the armature 25 is such that it tends to cause the disk 31 and its member 38 to be revolved in a counter-clockwise direction, while current flowing from the battery 20 to the translating devices through the metering mechanism tends to cause the disk 31 and its lever 38 to be revolved in a clockwise direction. The contact lever 38 is shown as connected with the wire 24, and when sufficiently revolved from the position shown in the drawing, in a left-handed direction, as by current supplied by the generator to the battery, 38 comes into electrical connection with the contact member 40, which is connected as by wire 41 with the insulated contact member 42 carried upon one extremity of the lever 9; and when the said lever is in the position indicated in the drawing, the member 42 is in contact with the contacting member 43, connected with one end of the solenoid 44, the opposite end of which is connected as by wire 45 with the solenoid 46, the opposite end of which is connected through wire 47 to the wire 19. If the member 38 be revolved in a clockwise direction from the position shown in the drawing, as for example by current supplied from the battery to the translating devices through the metering mechanism, the said member 38 may come into electrical communication and make a sweeping contact with the member 48, connected as by wire 49 with the solenoid 50, having its opposite terminal connected with the contact member 51, adapted to come into electrical communication with the insulated contact member 52, if the lever 9 be swung to the right, beyond a central position, whereupon the spring 11 will tend to swiftly swing the said lever to its maximum position in a right-handed direction, as well understood, in the reverse manner to which the compression spring 11 is shown as operating upon the said lever in their respective positions in the drawing. The member 52 is connected with the wire 45, and thence through coil 46 and wire 47 to the wire 19. The coil 44 is shown as provided with a plunger 53, which the said coil tends to move in a right-handed direction when energized, and at such time stretch the spring 54, and thus tend to swing the lever 9 in a right-handed direction. The coil 50 is shown as provided with a core 55, and when energized the said coil tends to move the core in a left-handed direction and stretch the spring 56 so as to tend to swing the lever 9 in a left-handed direction, or into the position shown in the drawing. If the lever 9 be swung in a clockwise direction, contact will be broken between the said lever and the screw or adjustable contact means 12, and established between the said lever and the contact means or adjustable screw 57, and any current then flowing from the generator through wire 7 and lever 9 will pass through the winding 58, one end of which is connected with the member 57, and thence through the adjustable shunt 59 to the wire 17, in communication with the translating devices 18, from which return is made through the wire 19. The variable resistance or other type of regulator indicated at 16 is depicted as controlled by a potential coil 60 in shunt across the translating circuit, the said coil tending to pull the core 61 downwardly when energized, against the action of the adjustable spring 62, so as to increase the resistance 16 and hold the potential upon the translating devices substantially constant, in a well known manner, while too sudden movement of the core 61 is resisted by the dash-pot 63. The adjustable shunt 59 may be employed for the purpose of diverting some current through the coil 64, which may assist the coil 60 for a purpose which will hereinafter more plainly appear. The regulator indicated by the carbon pile 3 is controlled as by the lever 65, carrying at one extremity the core of magnetic material 66, and normally swung by the weight of the core, or by springs or other equivalent means, if desired, toward the stop or limiting device 67, in such manner as to tend to compress the pile 3 and lower the resistance thereof in a well known manner. The coil 46 when energized tends to lift the core 66 and reduce the resistance 3, while the main operating solenoid 68, in shunt across the translation circuit, tends when energized to also lift the core 66 and increase resistance 3, as will hereinafter be more plainly pointed out. Too sudden movement of the core 66 is resisted as by means of the dash-pot 69. 70 is a lever normally swung in a counter-clock-wise direction by the weight of the core 71 carried upon one extremity thereof, or by springs or other suitable devices, so as to tend to approach the stop 72 and compress or lower the resistance of the pile or regulator 3. The coil 8 surrounds the core 71 and tends when energized to lift the same to increase the regulating effect of the pile or element 3, while too sudden movement of the said core is restrained by the dash-pot mechanism 73. 78 is a potential coil across the generator for closing the main switch 5 when the potential of the generator is substantially that of the battery.

In Fig. 2, the member 38 is shown as operated by a potential coil 74, which when the voltage of the battery 20 becomes sufficient draws the core 75 downwardly against the action of the adjustable spring 76, and causes contact between the said lever 38 and the contact member 40, as is done in Fig. 1 by the metering mechanism, which is suppressed and replaced by the voltage responsive coil either across the battery or generator circuit and parts coöperating therewith. Too sudden movement of the devices shown in Fig. 2 is resisted by the dash-pot 77.

An operation of my invention is substantially as follows:

If the generator be at rest or have its armature revolving below the critical speed, and if the translating circuit be closed, as shown in the drawing, wherein switches, etc. for controlling the translating devices are purposely omitted for sake of simplicity, current will flow from the battery 20, through the wire 21 to its connection with the shunts 22 and 23, where it will divide, part flowing through shunt 22 and part through the coil 27 and shunt 23, and part around said shunts through the armature 25 to the wire 24 and thence through the translating circuit regulating means 16 and wire 17 to the translating devices 18, from which return is made through the wire 19. And I so adjust the spring 62 that if the storage battery 20 have a voltage above that desired upon the translating devices 18, current flowing through the shunt or voltage coil 60 across the translation circuit will cause the said coil to draw its core 61 downwardly against the action of spring 62 and increase the resistance or other regulating effect of the regulator 16, in such manner as to automatically hold the desired translation circuit voltage upon the translating devices, in a well known manner. I preferably use a translation circuit regulator which will hold the voltage upon this circuit constant within very narrow limits, but details of construction of such delicately operating regulator are herein purposely omitted for the sake of simplicity, inasmuch as such regulators are now well known in the art. That small portion of the current supplied to the translating devices through the armature 25 around the adjustable shunts, and which may be readily regulated by adjusting the variable resistance shown in series with the said armature 25, will cause the said armature 25 to revolve, and this armature is so connected that this current flowing from the battery will cause the armature to revolve in such direction that the motion imparted through the worm 28 and the train of gears 29 is such that with 30 and 31 meshed, as indicated in the drawing, or in operative frictional contact, if preferred, the revolution of 31 and the lever 38 carried thereby is in a clockwise direction. I so adjust the spring 34 that if the voltage of the battery 20 is at or above the normal working voltage of the battery, the magnet 33, by attracting any suitable armature or other means, as indicated in the drawing, will hold the disk 31 in operative contact with the pinion 30, and if the voltage of the battery fall below this, or a predetermined point of adjustment, 33 will allow the spring 34 to break the operative contact or communication between 30 and 31, whereupon the spring 37 will revolve the disk 31 and lever 38 in a clockwise direction, establishing contact with the member 48, and returning the lever 38 to its position against the stop 39, regardless of the position occupied by the lever 38 at the time the magnet 33 permitted the spring 34 to break the operative engagement of the metering mechanism. The coil 27 is so wound that current flowing from the battery through the said coil, as when flowing to the translating devices, tends to slightly weaken the field set up by the permanent magnet or other equivalent means 26, and thus increase the speed of the armature 25, as current through 27 is increased. I adjust the proportion of the current desired to be carried by the coil 27 by adjustment of the shunts 22 and 23 with respect to each other; while I adjust the relative amount of current which shall go through the armature 25 by adjusting the total resistance of these shunts with respect to the armature circuit, including the armature 25, or by adjusting the resistance of the said circuit in a well known manner.

If now the generator speed be increased and its voltage brought up to substantially equal that of the battery 20, coil 78 will close the main switch 5; and, if the generator voltage be above the battery, current will flow from the generator through lead 4, switch 5 and coil 6, in such manner as to tend to hold the switch 5 closed, and thence through wire 7, solenoid 8, wire 7, lever 9, contact device 12, winding 13, wire 15; and, if the voltage of the generator be such as to cause it to supply more current than is being used by the translating devices, it will supply the said devices through regulating means 16, wire 17, and return to the generator through wire 19, and will also supply current to the storage battery 20 through wire 24, shunts 22 and 23 and wire 21, return from the battery being also made through wire 19. The current supplied to the battery will cause the armature 25 to revolve in the reverse direction and tend to so operate the metering mechanism as to revolve the member 38 into contact with the member 40 when a certain predetermined quantity of current has been supplied to the battery. The current supplied to the battery through shunt 23 and coil 27 will strengthen the magnetic field ordinarily set up by the permanent magnet 26, and therefore tend to reduce the speed of the armature 25 when revolving in this direction; and, by proper adjustment, I can thus make the metering mechanism impart more angular motion to 38 when the battery is discharging at a certain rate, than is imparted in the opposite direction when the battery is charging at this same rate, and in this manner I approach quite accurately a means of measuring the amount of current which should be put into a battery with respect to what has been taken from it, with due allowance for the inefficiency of the battery itself.

During the above outlined operation, the voltage upon the translation circuit will be held from exceeding the predetermined value, by the coil 60 operating the regulating means 16; and I so adjust the weight of the core 71, or other equivalent means, and the winding 8, that if at any time the current delivered by the generator shall tend to exceed a predetermined limit, which, if desired, may be a maximum protective value, a material increase above this amount will be prevented by the attraction of the coil 8 lifting core 71 evenly against the action of dash-pot 73 and increasing the resistance 3, in such manner as to cut down the excitation of the field coil 2 and prevent this maximum current from being exceeded, in a manner well understood by those familiar with this art.

I so adjust the weight of the core 66, or other adjustable means, if same be preferred, that with the translation circuit voltage held constant by the coil 60 and the translation circuit regulating means 16, the said voltage across the translation circuit, which is also impressed upon the coil 68, will not raise the lever 65 to appreciably affect the resistance or regulating means 3, but will be capable of doing so upon a very slight increase above this predetermined voltage, or with very slight assistance from some other source. If, now, the generator continue to supply whatever current is used in the translation circuit, and to charge the battery, as above outlined, until the predetermined current deemed necessary to charge the battery shall have been measured as having been delivered to the battery, the metering mechanism will bring the lever 38 into contact with the member 40, then current will flow from 24 through contact 38—40, wire 41, contact 42—43, solenoid 44, wire 45, coil 46, and wire 47 to wire 19, the current in the coil 46 being adjustable, if desired, as by means of the adjusting shunt shown around the said coil. The current in the coil 44 moves the plunger 53 in a right-handed direction, and the spring 54 will be stretched and tend to pull the lever 9 of magnetic material away from the core 14. However, so long as there be any current passing through the winding 13 from the generator, I can, if desired, by properly adjusting the screw or contact member 12, and allowing the lever 9 to come very close to, or actually freeze upon the core 14, prevent the spring 54 from moving the said lever 9 until the current from the generator has practically, if not entirely, ceased. If this point be reached, then 9 will be released and the tension of spring 54 will snap the lever 9 against the contact device 57 and connect the generator with the translation circuit instead of the battery circuit, and through winding 58. This action may readily be brought about by the instrumentalities shown in the drawing; for establishment of the contact 38—40 causes 46 to be energized, as above outlined, and assist the coil 68, whereupon the two coils acting together will evenly raise lever 65 against the action of dash-pot 69, and increase the field resistance 3 until the generator output is brought to practically nothing, or even brought to zero, and the main switch 5 opened, if desired. Then lever 9 will connect the generator circuit with the translation circuit, as above outlined, simultaneously breaking the contact 42—43 and throwing coils 46 and 44 out of action and completing the contact 51—52. With the winding 46 now thrown out of action, the lever 65 will tend to descend evenly against the action of dash-pot 69 and gradually decrease the resistance 3 and increase the generator voltage so that if the main switch were opened, it will again close, and the voltage gradually will rise and supply current to the translating devices. This current will pass through the coil 58 and tend to hold the lever 9 in this position. And, if desired, the current supplied to the translating devices, or a portion thereof, may be diverted, as indicated, through coil 64, in such manner as to assist the coil 60 and cause the translation circuit regulator to operate upon a somewhat lower voltage than the standard translation circuit voltage, whereupon a considerable resistance will be imposed between the battery and the translation circuit, preventing material discharge from the battery to the said circuit, even though the voltage of said circuit be below that of the battery. The slight lowering of the standard of the translation circuit regulator will throw the work of regulating the translation circuit now upon the delicately operating generator regulator controlled by the coil 68, and the translating devices will be supplied by the generator at substantially constant voltage, regardless of speed changes, which may be made approximate or equal to the standard lamp voltage, depending upon the accuracy with which the devices are made to operate, and no appreciable loss will be incurred by holding a higher voltage upon the storage battery than upon the translation circuit, because the translation circuit current will not have to traverse the device, causing this difference in potential, the said devices being fed and regulated directly from the generator.

If now the generator slow down until the generator is no longer able to supply the total current to the translating devices, the coil 68 will have decreased the resistance in the generator field circuit to the minimum, and can then of course go no further toward causing the generator to supply the translation circuit, and a portion of the current will first be supplied by the battery, and then this portion increased until the total load is carried by the battery, and if the generator speed continue to sink, its output will fall to nothing and the main switch 5 will open in a well known manner and the total current will be supplied by the battery and the lamp circuit voltage regulated through the instrumentality of the coil 60, the coil 61 going out of action in its modifying function, as above outlined, as the generator current decreases, and we have the translating circuit fed from the battery, as specified at the beginning of the operation above outlined. However, we now have a fully charged battery, and the lever 9 against the stop 57, so that the generator circuit is connected to the translation circuit instead of the charging circuit, as it was in the beginning of the operation outlined above. The current now supplied by the battery to the translating devices will tend to rotate the lever 38 in a right-handed direction and break contact 40, and when a certain amount of current has been drawn from the battery, which may be predetermined, and may be adjustable, if desired, 38 will come into wiping contact with the member 48, whereupon current will flow from 24, through contact 38—48, wire 49, solenoid 50, contact 51—52, wire 45, from which connection may be carried directly to the wire 19, or as shown in the drawing, through wire 45, coil 46 and wire 49 to the wire 19. This current in the coil 50 will move the core 55 in a left-handed direction and stretch spring 56 and pull the lever 9 into the position shown in the drawing, whereupon if the generator be started, the above outlined operation may be substantially repeated.

However, if instead of slowing down and stopping the generator slow down to that point where it supplies a portion of the current to the lamp circuit, but a considerable part of the said current is supplied by the battery, and this condition prevail for some length of time, so as to consume considerable battery current, then the establishment of the contact 38—48, due to the current having been taken from the storage battery, will stretch the spring 56, but the lever 9 will not be released by the magnet excited by the winding 58, but will be held, and the generator connection to the translation circuit will remain until the current flowing through 46 has, by coöperating with the coil 68, increased the resistance 3 and weakened the generator current to substantially nil and then the lever 9 will be snapped quickly into the position shown in the drawing, with the connection above outlined, and the contact 51—52 again broken, whereupon coil 46 will become inactive and allow the generator to again pick up gradually and come into circuit and supply the battery and the translating devices, if its speed be sufficient, as first outlined above. If at any time the current supplied to the battery and controlled by the metering mechanism be insufficient, due to inefficiency of the battery or other causes, and the battery is not kept properly charged, its voltage will eventually fall to that point where the magnet 33 will allow the spring 34 to break contact between the disk 31 and the pinion 30, and the spring 37 will then revolve the lever 38 in a right-handed direction to the starting point, whereupon the full charge will again be measured out to the battery and the metering mechanism reset and the battery brought into step, or phase, so to speak.

In that modification shown in Fig. 2, the metering mechanism in toto is suppressed, and when the battery becomes fully charged and its voltage has reached the fully charged value, solenoid 74 will draw the core 75 downwardly against the action of dash-pot 77, and adjustable spring 76, and establish the contact 40 to perform the same function that establishment of the contact 38—40 did above, when operated by the metering means. When the voltage of the battery falls below this fully charged or a predetermined value, the contact 38—40 will be broken, and the contact 38—48 made, which will reset the regulating devices in the same manner as when the same contact was made in the metering mechanism, as above described.

It will be noted in the above that I have shown the current coil 8 in series with the generator, and, therefore, determining the maximum generator output that can be obtained. It is, however, within the scope of my invention to put this coil in the battery circuit, as in 19 or 21, whereupon a charging current value cannot be exceeded, or if desired to place the said coil in any other circuit wherein it is desired to limit the current value, or it is within my invention to suppress this coil entirely and depend upon any other means of protection, or current limiting, if such be desired, as my invention comprehends broadly any means whereby when the battery is charged sufficiently, or to a predetermined amount, the generator will be disconnected from the charging circuit and connected to the translation circuit, the generator output being reduced or suppressed during this interval of change.

It will be obvious that I have produced a system which makes toward considerable economy above the usual system wherein, when the battery is charged up to a high voltage, the generator supplies current to the translating devices at substantially this charged voltage on one side of a regulating means, from the other side of which it is utilized in the translating devices after having suffered a drop often approaching the material value of something like 25%.

I do not wish in any way to limit myself to any of the exact constructions, or details of devices, or modes of operation above outlined to show concrete cases merely embodying the essentials of my invention, which is as set forth in the following claims:

1. The combination with a source of electrical potential difference, a storage battery circuit and a translation circuit, of means for connecting the source under certain conditions with the battery circuit to impress the voltage of the source thereupon and under other conditions with the translation circuit to impress the voltage of the source thereupon and affecting the source.

2. The combination with a source of electrical potential difference, a storage battery circuit and a translation circuit, of automatic means for connecting the source under certain conditions with the storage battery circuit to charge the battery and under other conditions with the translation circuit to supply said circuit without charging the battery and affecting the source.

3. The combination with a source of electrical potential difference, a storage battery circuit and a translation circuit, of means for connecting the source with the battery circuit and with the translation circuit and means for determining which of said connections shall be made and affecting the source.

4. The combination with a source of electrical potential difference, a storage battery circuit and a translation circuit, of means for connecting the source with the battery circuit and with the translation circuit and means for determining which of said connections shall be made and affecting the source during the changing of said connections.

5. The combination with a source of electrical potential difference, a storage battery circuit and a translation circuit, of means for connecting the source with the battery circuit and with the translation circuit and means for determining which of said connections shall be made depending upon the condition of the battery and affecting the source upon changing connections.

6. The combination with a source of electrical potential difference, a storage battery circuit and a translation circuit, of means for connecting the source with the battery circuit and with the translation circuit and means for determining which of said connections shall be made depending upon the condition of the battery and affecting the source during the changing of connections.

7. The combination with a source of electrical potential difference, a storage battery circuit and a translation circuit, of means for connecting the source with the battery circuit and with the translation circuit and means for determining which of said connections shall be made and affecting the source depending upon the amount of current supplied to the battery.

8. The combination with a source of electrical potential difference, a storage battery circuit and a translation circuit, of means for connecting the source with the battery circuit and with the translation circuit and means for determining which of said connections shall be made depending upon the amount of current supplied to the battery and affecting the source during the changes of connections.

9. The combination with a source of electrical potential difference, a storage battery circuit and a translation circuit, of means for connecting the source with the battery circuit and with the translation circuit and means for determining which of said connections shall be made and affecting the source depending upon the amount of current supplied by the battery.

10. The combination with a source of electrical potential difference, a storage battery circuit and a translation circuit, of means for connecting the source with the battery circuit and with the translation circuit and means for determining which of said connections shall be made depending upon the amount of current supplied by the battery and affecting the source during the changes of connections.

11. The combination with a source of electrical potential difference, a storage battery circuit and a translation circuit, of means for connecting the source with the battery circuit and with the translation circuit and means for determining which of said connections shall be made and affecting the the source depending upon the amount of current supplied to and by the battery.

12. The combination with a source of electrical potential difference, a storage battery circuit and a translation circuit, of means for connecting the source with the battery circuit and with the translation circuit and means for determining which of said connections shall be made depending upon the amount of current supplied to and by the battery and affecting the source during the changes of connections.

13. The combination with a source of electrical potential difference, a storage battery circuit and a translation circuit, of automatic means for connecting the source with the battery circuit and with the translation circuit, and automatic means for determining which of said connections shall be made and affecting the source.

14. The combination with a source of electrical potential difference, a storage battery, a battery circuit, translating devices and a translating circuit, of a regulator between the battery circuit and the translating circuit, and automatic means affected by the storage battery for connecting the source upon opposite sides of said regulator and affecting the source.

15. The combination with a source of electrical potential difference, a storage battery, a battery circuit, translating devices and a translating circuit, of a regulator between the battery circuit and the translating circuit, and automatic means for connecting the source upon opposite sides of said regulator and affecting the source and affected by the condition of the storage battery.

16. The combination with a source of electrical potential difference, a storage battery, a battery circuit, translating devices and a translating circuit, of a regulator between the battery circuit and the translating circuit, and automatic means for connecting the source upon opposite sides of said regulator and affecting the source affected by the current delivered to and taken from the storage battery.

17. The combination with a source of electrical potential difference, a storage battery, a battery circuit, translating devices and a translating circuit, of a regulator between the battery circuit and the translating circuit, and automatic means for connecting the source upon opposite sides of said regulator and affecting the source affected in different degrees by the current delivered to and taken from the storage battery.

18. The combination with a source of electrical potential difference, a storage battery, a battery circuit, translating devices and a translating circuit, of a regulator between the battery circuit and the translating circuit, and automatic means for connecting the source upon opposite sides of said regulator and affecting the source in response to conditions of the storage battery, and means for affecting the same in response to a condition of the battery.

19. The combination with a source of electrical potential difference, a storage battery, a battery circuit, translating devices and a translating circuit, of a regulator between the battery circuit and the translating circuit, and automatic means for affecting the connection of the source with the battery circuit and the translating circuit responsive to conditions of the storage battery and affecting the source while affecting its circuit connections.

20. The combination with a source of electrical potential difference, a storage battery, a battery circuit, translating devices and a translating circuit, of a regulator between the battery circuit and the translating circuit, and automatic means for affecting the connection of the source with the battery circuit and the translating circuit responsive to conditions of the storage battery and decreasing the output of the source while affecting its circuit connections.

21. The combination with a source of electrical potential difference, a storage battery, a battery circuit, translating devices and a translating circuit, of a regulator between the battery circuit and the translating circuit, and automatic means for affecting the connection of the source with the battery circuit and the translating circuit responsive to conditions of the storage battery and suppressing the output of the source while affecting its circuit connections.

22. The combination of a source of electrical potential difference, a storage battery, a battery circuit, translating devices and a translating circuit, of regulating means uniting the battery and the translating circuits, means for connecting the source with the battery circuit and with the translating circuit and affecting the source while affecting said connections.

23. The combination with a source of electrical potential difference, a storage battery, a battery circuit, translating devices and a translating circuit, of a regulator between the battery circuit and the translating circuit, and automatic means for affecting the connection of the source with the battery circuit and the translating circuit responsive to conditions of the storage battery and affecting the translating circuit regulator.

24. The combination with a source of electrical potential difference, a storage battery, a battery circuit, translating devices and a translating circuit, of a regulator between the battery circuit and the translating circuit, and automatic means for affecting the connection of the source with the battery circuit and the translating circuit responsive to conditions of the storage battery and affecting the translating circuit regulator while affecting the circuit connections of the source.

JOHN L. CREVELING.